(12) United States Patent
Snyder et al.

(10) Patent No.: US 8,480,527 B2
(45) Date of Patent: Jul. 9, 2013

(54) GEARING ARRANGEMENT

(75) Inventors: Tony Snyder, Indianapolis, IN (US);
Gregory Blake, Noblesville, IN (US);
Andrew D. Copeland, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 841 days.

(21) Appl. No.: 12/199,053

(22) Filed: Aug. 27, 2008

(65) Prior Publication Data
US 2010/0056321 A1 Mar. 4, 2010

(51) Int. Cl.
*F16H 1/32* (2006.01)
(52) U.S. Cl.
USPC .......................................... 475/162; 475/331
(58) Field of Classification Search
USPC .............................. 475/162, 169, 170, 331, 338
See application file for complete search history.

(56) References Cited

U.S. PATENT DOCUMENTS

| | | | |
|---|---|---|---|
| 3,722,213 A | 3/1973 | Carter et al. | |
| 4,759,229 A * | 7/1988 | Takahashi et al. | 74/409 |
| 4,896,567 A * | 1/1990 | Zhou | 475/170 |
| 5,120,516 A | 6/1992 | Ham et al. | |
| 5,324,240 A * | 6/1994 | Guttinger | 475/162 |
| 5,360,380 A * | 11/1994 | Nottle | 475/182 |
| 5,813,214 A | 9/1998 | Moniz et al. | |
| 6,010,304 A | 1/2000 | Moniz et al. | |
| 6,071,076 A | 6/2000 | Ansari et al. | |
| 6,546,735 B1 | 4/2003 | Moniz et al. | |
| 6,619,030 B1 | 9/2003 | Seda et al. | |
| 6,684,626 B1 | 2/2004 | Orlando et al. | |
| 6,711,887 B2 | 3/2004 | Orlando et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 6,935,837 B2 | 8/2005 | Moniz et al. | |
| 7,007,488 B2 | 3/2006 | Orlando et al. | |
| 7,055,330 B2 | 6/2006 | Miller | |
| 7,096,674 B2 | 8/2006 | Orlando et al. | |
| 7,186,073 B2 | 3/2007 | Orlando et al. | |
| 7,195,446 B2 | 3/2007 | Seda et al. | |
| 7,195,447 B2 | 3/2007 | Moniz et al. | |
| 7,223,197 B2 | 5/2007 | Poulin et al. | |
| 7,269,938 B2 | 9/2007 | Moniz et al. | |
| 7,290,386 B2 | 11/2007 | Orlando et al. | |
| 7,296,398 B2 | 11/2007 | Moniz et al. | |
| 7,334,392 B2 | 2/2008 | Moniz et al. | |
| 7,334,981 B2 | 2/2008 | Moniz et al. | |

(Continued)

FOREIGN PATENT DOCUMENTS

WO    WO 2007016336 A2 *  2/2007

*Primary Examiner* — Justin Holmes
*Assistant Examiner* — Huan Le
(74) *Attorney, Agent, or Firm* — Krieg DeVault LLP

(57) ABSTRACT

A gearing arrangement is disclosed herein. The gearing arrangement includes a shaft operable to rotate about an axis of rotation. The gearing arrangement also includes a first gear fixed for rotation with the shaft and encircling the axis of rotation. The gearing arrangement also includes a plate member positioned radially adjacent to the shaft. The gearing arrangement also includes a second gear operable to mesh with the first gear. The gearing arrangement also includes a layshaft supporting the second gear. The layshaft extends along a central axis between first and second ends. The layshaft is engageable with the plate member in a plurality of different positions to adjustably position the second gear relative to the first gear.

18 Claims, 3 Drawing Sheets

U.S. PATENT DOCUMENTS

| | | | |
|---|---|---|---|
| 7,353,647 B2 | 4/2008 | Orlando et al. | |
| 7,386,983 B2 | 6/2008 | Miller | |
| 7,390,277 B2 * | 6/2008 | Egawa | 475/159 |
| 7,458,202 B2 | 12/2008 | Moniz et al. | |
| 7,490,460 B2 | 2/2009 | Moniz et al. | |
| 7,490,461 B2 | 2/2009 | Moniz et al. | |
| 7,493,753 B2 | 2/2009 | Moniz et al. | |
| 7,493,754 B2 | 2/2009 | Moniz et al. | |
| 7,510,371 B2 | 3/2009 | Orlando et al. | |
| 7,513,102 B2 | 4/2009 | Moniz et al. | |
| 7,513,103 B2 | 4/2009 | Orlando et al. | |
| 7,526,913 B2 | 5/2009 | Orlando et al. | |
| 2003/0163984 A1 | 9/2003 | Seda et al. | |
| 2004/0020186 A1 | 2/2004 | Orlando et al. | |
| 2004/0254042 A1 * | 12/2004 | Tsurumi | 475/163 |
| 2005/0255961 A1 * | 11/2005 | Morita | 475/331 |
| 2006/0148612 A1 * | 7/2006 | Albers et al. | 475/331 |
| 2006/0288686 A1 | 12/2006 | Cherry et al. | |
| 2007/0084183 A1 | 4/2007 | Moniz et al. | |
| 2007/0084186 A1 | 4/2007 | Orlando et al. | |
| 2007/0087892 A1 | 4/2007 | Orlando et al. | |
| 2007/0125066 A1 | 6/2007 | Orlando et al. | |
| 2007/0137175 A1 | 6/2007 | Moniz | |
| 2007/0157596 A1 | 7/2007 | Moniz | |
| 2007/0234704 A1 | 10/2007 | Moniz et al. | |
| 2007/0240399 A1 | 10/2007 | Orlando et al. | |
| 2008/0014095 A1 | 1/2008 | Moniz et al. | |
| 2008/0044276 A1 * | 2/2008 | McCune et al. | 415/122.1 |
| 2008/0053099 A1 | 3/2008 | Venkataramani et al. | |
| 2008/0053100 A1 | 3/2008 | Venkataramani et al. | |
| 2008/0072567 A1 | 3/2008 | Moniz et al. | |
| 2008/0072568 A1 | 3/2008 | Moniz et al. | |
| 2008/0072569 A1 | 3/2008 | Moniz et al. | |
| 2008/0075590 A1 | 3/2008 | Moniz et al. | |
| 2008/0098713 A1 | 5/2008 | Orlando et al. | |
| 2008/0098714 A1 | 5/2008 | Orlando et al. | |
| 2008/0098715 A1 | 5/2008 | Orlando et al. | |
| 2008/0098716 A1 | 5/2008 | Orlando et al. | |
| 2008/0098717 A1 | 5/2008 | Orlando et al. | |
| 2008/0098718 A1 | 5/2008 | Henry et al. | |
| 2008/0110152 A1 | 5/2008 | Kemper et al. | |
| 2008/0110153 A1 | 5/2008 | Seda et al. | |
| 2008/0110154 A1 | 5/2008 | Kemper et al. | |
| 2008/0112791 A1 | 5/2008 | Lee et al. | |
| 2008/0112793 A1 | 5/2008 | Lee et al. | |
| 2008/0112794 A1 | 5/2008 | Lee et al. | |
| 2008/0112795 A1 | 5/2008 | Lee et al. | |
| 2008/0112801 A1 | 5/2008 | Moniz et al. | |
| 2008/0112802 A1 | 5/2008 | Orlando et al. | |
| 2008/0148708 A1 | 6/2008 | Chou et al. | |
| 2008/0148881 A1 | 6/2008 | Moniz et al. | |
| 2008/0152477 A1 | 6/2008 | Moniz et al. | |
| 2008/0159851 A1 | 7/2008 | Moniz et al. | |
| 2008/0159852 A1 | 7/2008 | Stephenson et al. | |
| 2008/0159856 A1 | 7/2008 | Moniz et al. | |
| 2008/0194378 A1 * | 8/2008 | Fox | 475/347 |
| 2009/0064683 A1 | 3/2009 | Moniz et al. | |

* cited by examiner

GEARING ARRANGEMENT

STATEMENT REGARDING FEDERALLY SPONSORED RESEARCH OR DEVELOPMENT

The present invention was made under U.S. Government Contract Number F33615-03-D-2357 awarded by the Department of Defense, and the Department of Defense may have certain rights in the present invention.

BACKGROUND OF THE INVENTION

1. Field of the Invention

The invention relates to the arrangement of a plurality of gears relative to one another, such as in a gear box.

2. Description of Related Prior Art

Gears are rotational bodies with teeth that are intended to mesh with teeth defined in another body. The most common situation is for a gear to mesh with another gear, but a gear can mesh with any device having compatible teeth, such as linear-moving racks, chains, and belts. When two gears are meshed, the motion of the first gear in a first direction causes the second gear to rotate in a second direction opposite to the first direction. Gears are used to transmit motion and power without slippage. Depending on their construction and arrangement, gears can transmit forces at different speeds, torques, or in a different directions, from a power source. The speed of the driven gear, in revolutions per minute (rpm), is dependent upon its diameter and the diameter and speed of the driving gear.

SUMMARY OF THE INVENTION

In summary, the invention is a gearing arrangement. The gearing arrangement includes a shaft operable to rotate about an axis of rotation. The gearing arrangement also includes a first gear fixed for rotation with the shaft and encircling the axis of rotation. The gearing arrangement also includes a plate member positioned radially adjacent to the shaft. The gearing arrangement also includes a second gear operable to mesh with the first gear. The gearing arrangement also includes a layshaft supporting the second gear. The layshaft extends along a central axis between first and second ends. The layshaft is engageable with the plate member in a plurality of different positions to adjustably position the second gear relative to the first gear.

BRIEF DESCRIPTION OF THE DRAWINGS

Advantages of the present invention will be readily appreciated as the same becomes better understood by reference to the following detailed description of an exemplary embodiment when considered in connection with the accompanying drawings wherein.

DETAILED DESCRIPTION OF AN EXEMPLARY EMBODIMENT

Figure 1:
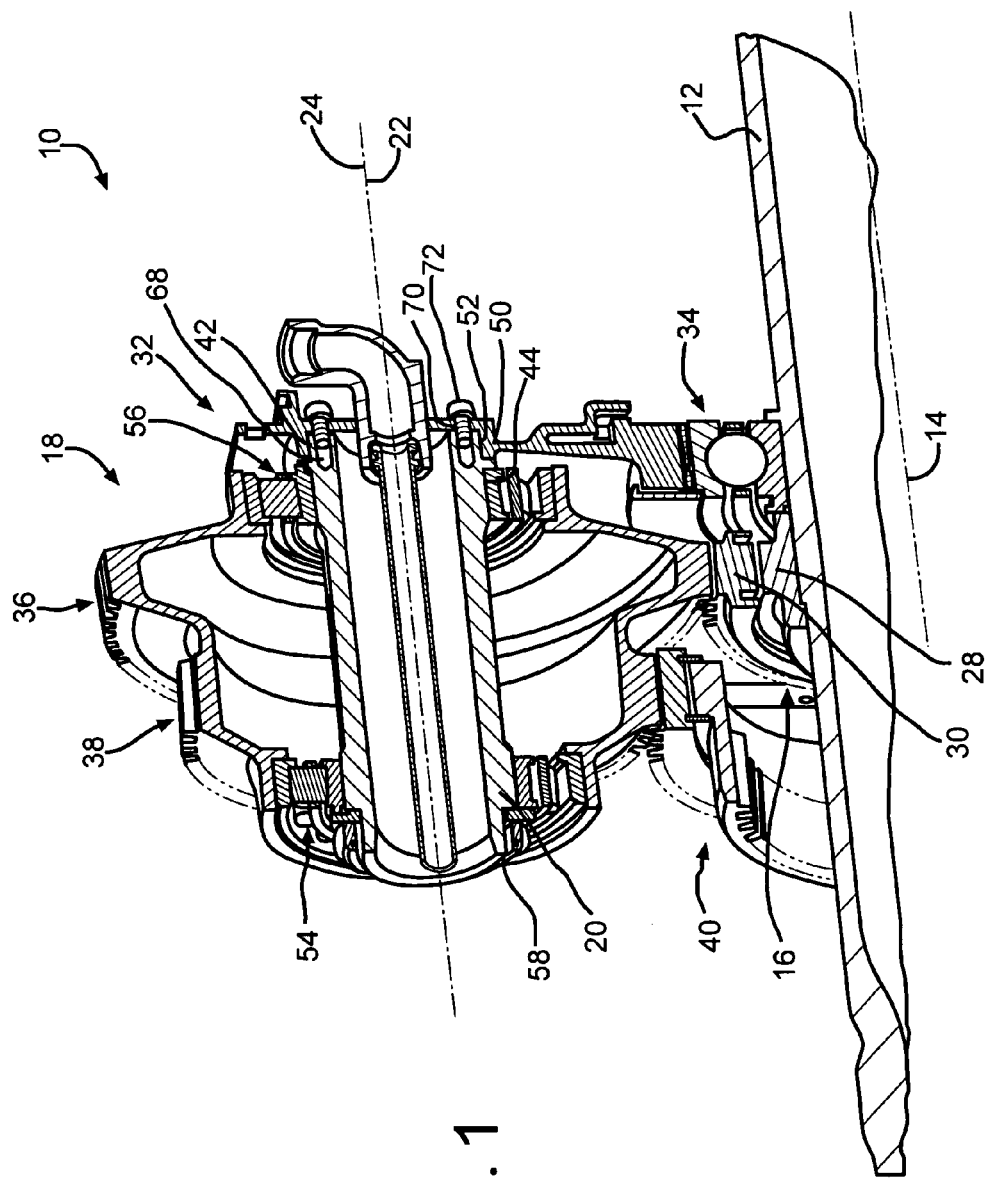
FIG. 1 is a perspective view of an exemplary embodiment of the invention with a portion cut-away.

FIG. 1 shows a gearing arrangement 10 according to an exemplary embodiment of the invention. The exemplary gearing arrangement 10 includes an input shaft 12 rotating about an axis 14 of rotation and driving a sun gear 16. The sun gear 16 drives a plurality of follower gears and each follower gear 18 is supported by a layshaft 20. In FIG. 1, only one layshaft 20 and follower gear 18 is shown. However, FIG. 2 and this specification confirm that the exemplary embodiment of the invention can include more than one follower gears positioned about the axis 14 of rotation.

A central axis 22 of each layshaft 20 is the axis 24 of rotation for the follower gear 18 supported on that layshaft 20. The distance between the axis 14 and the axis 24 for a particular follower gear 18 is referred to as the operating center distance for that follower gear 18. If the respective operating center distances between each axis 24 and the axis 14 varies, the power distribution among the follower gears 18 becomes unequal. An unequal power split increases gear and bearing loads and therefore decreases system life. In the past, the solution to ensuring that the operating center distances were equal has been to demand tight manufacturing tolerances and to engage in match building. The exemplary embodiment disclosed herein of the broader invention eliminates the need for these costly solutions.

The exemplary gearing arrangement 10 can be the internal components of a gear box of a turbine engine. However, it is noted that alternative embodiments of the invention can be practiced to realize the benefits described above in different operating environments. It is noted that the benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiment and described herein are not limitations of the broader invention, but rather demonstrate industrial applicability.

As set forth above, the exemplary gearing arrangement 10 can be disposed in a turbine engine and constitute the internal portion of a gear box. The gear box can be for driving accessories of the turbine engine, or can be for driving a fan or propeller. It is noted that the invention can be practiced in operating environments other than a turbine engine. The shaft 12 can input power/rotation to the other components of the gearing arrangement 10 by rotating about the axis 14. The exemplary sun gear 16, or first gear 16, can include a first portion 28 fixed to the shaft 12 and encircling the axis 14 of rotation. The exemplary sun gear 16 can also include second portion 30 having a first plurality of teeth facing radially inward to engage the first portion 28 and a second plurality of teeth facing radially outward to engage the follower gears 18. Bifurcating the sun gear 16 as done in the exemplary embodiment of the invention can be desirable in that the second portion 30 is moveable relative to the axis 14 and relative to the first portion 28. The portion 30 can essentially "float" about the axis 14 as necessary. Relative movement between the first and second portions 28, 30 can permit the second portion 30 to passively locate to the optimum radial position during power transmission. The portion 30 is held in place axially by two retaining rings (not shown). The exemplary embodiment of the invention can in fact obviate the need for the second portion 30, as will be clear from the description below.

The gearing arrangement 10 also includes a plate member 32 positioned radially adjacent to the shaft 12. The exemplary plate member 32 can encircle the shaft 12. In the exemplary embodiment of the invention, a bearing 34 can be positioned between the shaft 12 and the plate member 32, allowing the plate member 32 to be fixed. However, the invention can be practiced in planetary gear arrangements in which the plate member or an analogous structure can rotate about the axis of rotation of the input shaft during operation.

The second portion 30 of the sun gear 16 can mesh with all of the follower gears 18. The exemplary follower gear 18 can include first and second portions 36, 38 fixed together for concurrent rotation. The exemplary first and second portions 36, 38 are integrally formed with respect to one another, but could be formed separately and fixedly connected together in alternative embodiments of the invention.

The second portion 30 of the sun gear 16 can drive the first portion 36 of the follower gear 18, resulting also in rotation of the second portion 38 of the follower gear 18. The second portion 38 of the follower gear 18 can mesh and drive a third gear 40. The third gear 40 can be fixed for rotation with an output shaft (not shown).

The follower gear 18 is supported for rotation on the layshaft 20. A plurality of bearings 54, 56 can be positioned between the layshaft 20 and the follower gear 18. The layshaft 20 extends along the central axis 22 between first and second ends 44, 58. The layshaft 20 is engageable with the plate member 32 in a plurality of different positions to adjustably position the follower gear 18 relative to the first gear 16 and relative to the axis 14 of rotation.

Figure 3:
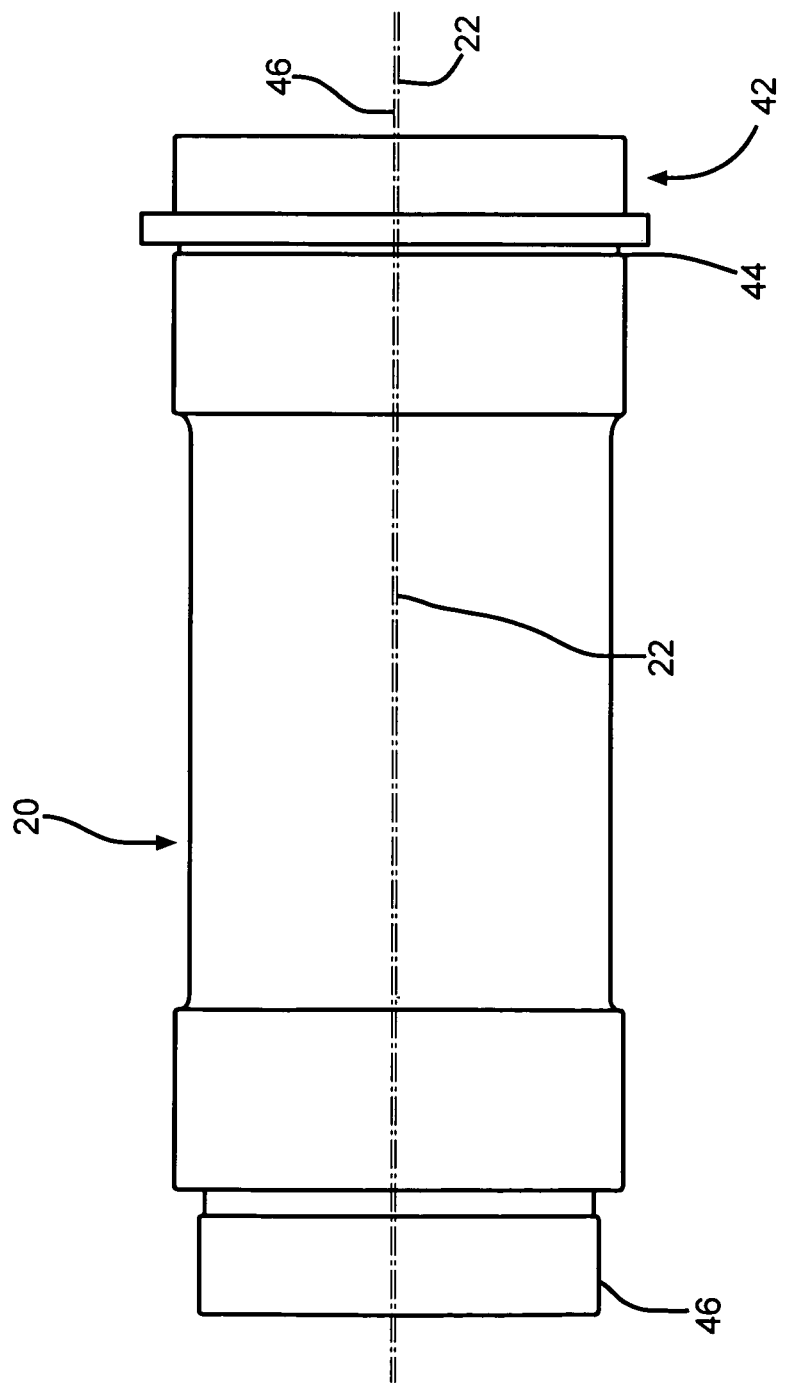
FIG. 3 is a side view of a component of the exemplary embodiment of the invention.

The connection between the layshaft 20 and the support plate 32 is made through a mounting block 42 and a boss 50 in the exemplary embodiment of the invention. As shown in FIG. 3, the mounting block 42 can be integrally formed with the first end 44 of the layshaft 20. In alternative embodiments of the invention, the mounting block 42 and layshaft 20 can be separately formed and fixedly connected to one another. The exemplary mounting block 42 can be cylindrical and centered on a secondary axis 46 parallel to the central axis 22 of the layshaft 20. In FIG. 3, the axes 22 and 46 are spaced from one another. The mounting block 42 is thus eccentric to the layshaft 20.

The axes 22 and 46 can be spaced from one another any desired distance. The greater the distance, the more eccentric the layshaft 20 and the mounting block 42 are to one another. Also, the range of adjustable movement of the layshaft 20 increases as the distance between the axes 22 and 46 increases. The distance can be selected in view of the manufacturing tolerances that can stack up in building the gearing arrangement 10 (shown in FIG. 1). In the exemplary embodiment of the invention, the axes 22 and 46 can be offset from one another by 0.020 inch, 0.010 inch radially outward and 0.010 inch radially inward. However, this dimension is only an example; other dimensions of offset can be applied in other embodiments of the invention.

Figure 2:
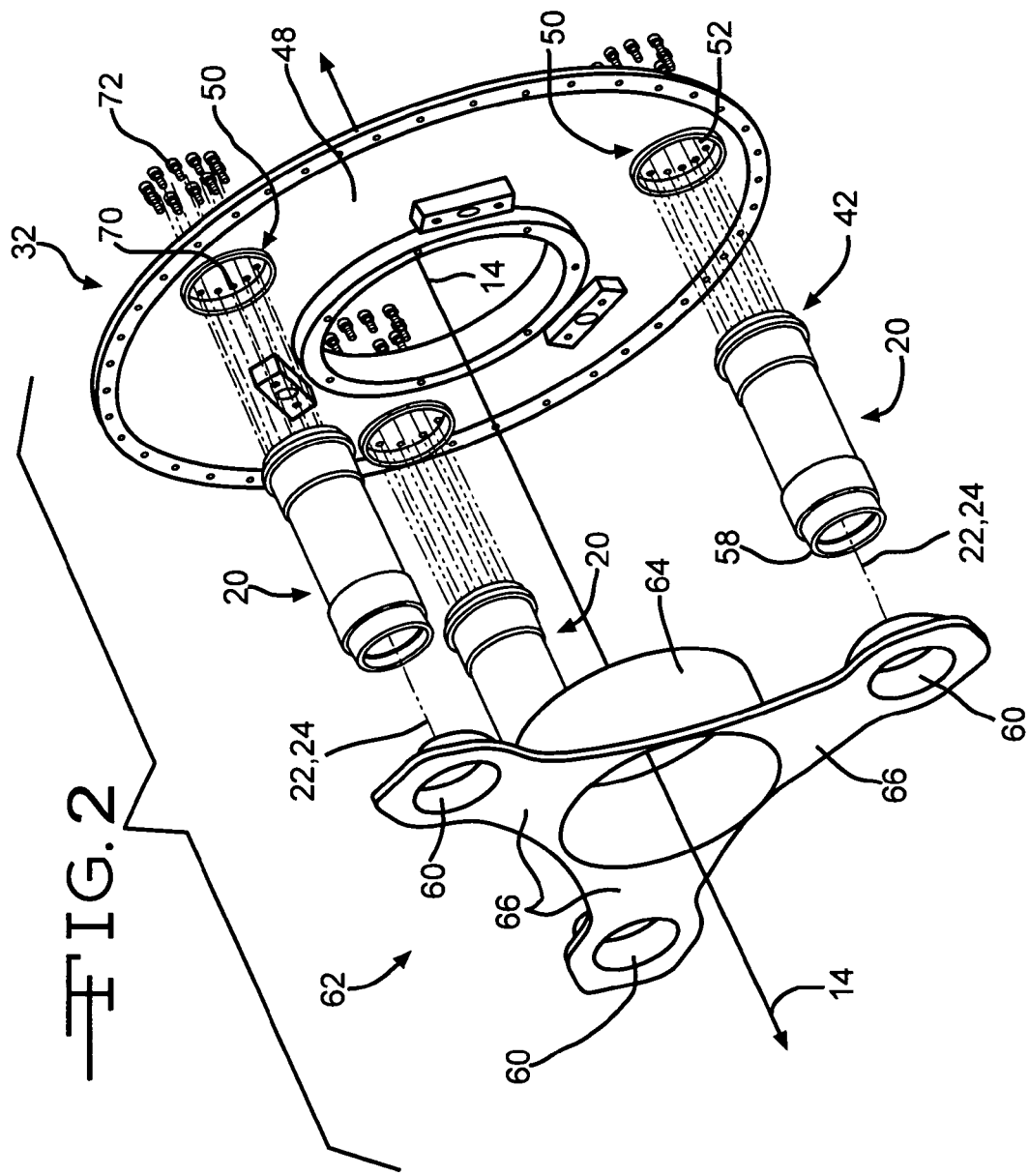
FIG. 2 is an exploded view of components of the exemplary embodiment of the invention.

Referring now to FIG. 2, the exemplary plate member 32 can include a plate portion 48 and a plurality of bosses 50 spaced from one another. The bosses 50 can be spaced evenly from one another about the axis 14 of rotation. Each boss 50 can project from the plate portion 48 along the first axis 14 of rotation and include a blind aperture 52 operable receive one of the mounting blocks 42. The inner surface of the blind aperture 52 can be complementarily shaped to the outer surface of the mounting block 42. Both are cylindrical in the exemplary embodiment of the invention, but could be any shape or polygonal pattern in alternative embodiments of the invention.

During assembly of the gear arrangement 10 (shown in FIG. 1), the eccentric mounting block 42 can be inserted into the blind aperture 52 defined by the support plate member 32. The mounting block 42 can then be rotated about its center axis 46 within the blind aperture 52 to move the layshaft 20 between the plurality of positions. For each layshaft, the axis 46 (shown in FIG. 3) can be spaced from the central axis 22 and from the axis 14 of rotation. Therefore, the plurality of different positions of the layshaft 20 can correspond to the central axis 22 being positioned at different radial distances from the axis 14 of rotation. The layshaft 20 is thus radially adjustable relative to the axis 14 of rotation. Also, because the mounting block 42 is eccentric to the layshaft 20, the plurality of different positions can also correspond to the central axis 22 of the layshaft 20 being at different circumferential positions about the axis 14 of rotation.

The cooperation between the mounting block 42 and the boss 50 limit movement of the plurality of layshaft 20 to rotation about the axis 46 (shown in FIG. 3). In other words, the plate member 32 guides rotation of each of the layshafts 20 through the cooperation between the mounting block 42 and the boss 50. The cooperation between the mounting block 42 and the boss 50 simplifies assembly by permitting controlled relative movement.

EXAMPLE 1

The following is one example for practicing the invention. The mounting block 42 can be inserted into the blind aperture 52 defined by the support plate member 32 such that the central axis 22 of the layshaft 20 is at baseline position. The mounting block 42 can then be rotated in a clockwise direction about its center axis 46 within the blind aperture 52 an angle of 18°, resulting in the central axis moving 0.0031 inch away from the axis 14. Alternatively, the mounting block 42 can then be rotated in a counter-clockwise direction about its center axis 46 within the blind aperture 52 an angle of 18°, resulting in the central axis moving 0.0031 inch toward the axis 14. The invention can be practiced where the angle between defined positions is other than 18° and/or where the radial distance of travel of the central axis is different than 0.0031 inch.

Continuing with example 1, the following table can apply to an exemplary embodiment of the invention:

| Axial Rotation vs. Radial Movement | |
|---|---|
| 90° | Y = 0.0100" |
| 72° | Y = 0.0095" |
| 54° | Y = 0.0081" |
| 36° | Y = 0.0059" |
| 18° | Y = 0.0031" |
| 0° | Y = 0.0000" |
| −18° | Y = −0.0031" |
| −36° | Y = −0.0059" |
| −54° | Y = −0.0081" |
| −72° | Y = −0.0095" |
| −90° | Y = −0.0100" |

The dimensions provided by the example set forth above are for illustration only and are not limiting to the invention. The dimensions provided herein can be helpful when considered relative to one another. For example, the example may be considered a relatively small embodiment. In a relatively large embodiment of the invention, one or more of the dimensions provided herein may be multiplied as desired. Also, different operating environments may dictate different relative dimensions.

Each layshaft 20 can be eccentrically rotated about the axis 46 until the second end 58 of that layshaft 20 is aligned with and receivable in a through-aperture 60 of a jig 62. The exemplary jig 62 can include a collar 64 positioned radially adjacent to and encircling the input shaft 12. The collar 64 can also encircle the output shaft (not shown). The jig 62 can be spaced from the plate member 32 along the first axis 14 of rotation and include a plurality of arms 66. Each arm 66 can extend radially outward from a root at the collar 64 to a distal end. Each of the through-apertures 60 can be individually defined in one of the plurality of arms 66 and can be spaced an equal distance from the axis 14 of rotation.

The jig 62, plate member 32, layshaft 20 and mounting block 42 can be designed such that the second end 58 of the layshaft 20 can be received in the through-aperture 60 when the layshaft 20 is in only one of the plurality of positions. That one position may be different for each layshaft, however, the result is that the respective central axes 22 (and the respective axes 24 of rotation for the follower gears 18) are positioned a substantially equal radial distance from the axis 14 of rotation. Thus, the operating center distances for all of the follower gears 18 (shown in FIG. 1) can be the same.

Positioning the second ends 58 in the through-apertures 60 fixes the radial position of each of the layshaft 20 with the common jig 62. The assembly process described above results in the taking-up of manufacturing tolerance stack-ups between the gear portion 36 and the sun gear 16 (shown in FIG. 1) as well as the gear portion 38 and the third gear 40. It achieves a better step-up to reduce stress on the teeth and achieve an optimal gear pattern. The assembly process described above also results in each of the layshafts 20 being an equal distance from the axis 14 of rotation.

After the second ends 58 have been received in the through-apertures 60, the layshafts 20 can be fixed to the plate member 32. As shown in FIG. 1, the mounting block 42 can include a first structure for connecting the layshaft 20 with the plate member 32. In the exemplary embodiment of the invention, a pattern of threaded apertures 68 defined in the mounting block 42. The pattern of threaded apertures 68 can be centered on the axis 46 (shown in FIG. 3). The plate member 32 can include a second structure for connecting the layshaft 20 and the plate member 32. In the exemplary embodiment of the invention, the second structure can be a second pattern of apertures 70, threaded or unthreaded. The pattern of threaded apertures 70 can also be centered on the axis 46 (shown in FIG. 3). The apertures 68, 70 can be aligned in a plurality of different configurations and receive fasteners 72. Other kinds of structures can be applied in alternative embodiments of the invention, including a single fastener or correspondingly shaped surfaces on the mounting block 42 and in the blind aperture 52 such as recesses and projections.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, while this document may draw attention to certain features believed to be of particular importance, it should be understood that the Applicant claims protection in respect of any patentable feature or combination of features hereinbefore referred to and/or shown in the drawings whether or not particular emphasis has been placed thereon.

What is claimed is:

1. A gearing arrangement comprising:
a shaft operable to rotate about an axis of rotation;
a first gear fixed for rotation with said shaft and encircling said axis of rotation;
a plate member positioned radially adjacent to said shaft;
a second gear operable to mesh with said first gear; and
a layshaft supporting said second gear, said layshaft extending along a central axis between first and second ends and engageable with said plate member in a plurality pre-set positive positions to adjustably position said second gear relative to said first gear, wherein the pre-set positive positions are offset relative to each other by pre-set negative positions in which the layshaft and the plate member are not engageable, wherein said plurality of different positions of said layshaft correspond to said central axis being positioned at different radial distances from said axis of rotation.

2. The gearing arrangement of claim 1 wherein said plurality of different positions correspond to said central axis of said layshaft being at different radial distances from said axis of rotation and different circumferential positions about said axis of rotation.

3. The gearing arrangement of claim 1 further comprising:
a first mounting block fixed to said first end of said layshaft and having a first structure for connecting said layshaft with said plate member, said first structure centered on a second axis eccentric to said central axis of said layshaft.

4. The gearing arrangement of claim 3 wherein said plate member further comprises a second structure for connecting said layshaft and said plate member, said second structure centered on said second axis and said first and second structures being patterns of apertures alignable in a plurality of different configurations.

5. The gearing arrangement of claim 1 further comprising:
a first mounting block fixed to said first end of said layshaft; and a first boss fixed to said plate member and defining a blind aperture, wherein said first mounting block is rotatable within said blind aperture to move said layshaft between said plurality of positions.

6. The gearing arrangement of claim 5 further comprising:
a jig positioned radially adjacent to said shaft and spaced from said plate member along said axis of rotation, said jig defining an aperture operable to receive said second end of said layshaft when said layshaft is in only one of said plurality of positions.

7. A method comprising the steps of:
driving a plurality of follower gears with a sun gear rotating about an axis of rotation;
supporting each of the plurality of gears with individual layshafts mounted on a support plate member; and
adjusting each of the layshafts on the support plate member to a first of a set of finite positions relative to the axis of rotation, wherein the set of finite positions is fixed and a plurality of null spaces exist between the fixed finite positions, the null spaces defined as a space in which the adjusting is not permitted;
wherein said adjusting step further comprises the steps of:
rotating each of the layshafts about respective secondary axes associated with each of the layshafts; and
spacing each of the secondary axes from a central axis associated with each of the respective layshafts and also from the axis of rotation of the sun gear.

8. The method of claim 7 further comprising the step of:
positioning respective axes of rotation for each of the follower gears a substantially equal radial distance from the axis of rotation by selectively moving at least one of the layshafts after at least partial engagement with the support plate member.

9. The method of claim 7 further comprising the steps of:
guiding rotation of each of the layshaft with the support plate member; and
fixing the radial position of each of the layshafts with a common jig after said rotating and guiding steps.

10. The method of claim 7 further comprising the step of:
taking up manufacturing tolerance stack-ups between the follower gears and the sun gear by radially moving at least one of the layshafts during said adjusting step such that each of the layshafts is an equal distance from the axis of rotation.

11. The method of claim 7 further comprising the steps of
integrally forming each of the layshafts with an eccentric mounting block at one end;
inserting the eccentric mounting blocks of each of the layshafts into respective apertures defined by the support plate member;
positioning a jig having a plurality of apertures in spaced relation to the support plate member along the first axis of rotation; and
individually rotating each of the layshafts after said inserting step until each of the layshafts is aligned with one of the apertures of the jig.

12. A gear box in turbine engine comprising:
an input shaft operable to rotate about an axis of rotation;
a sun gear fixed for rotation with said input shaft;
a plate member positioned radially adjacent to and encircling said input shaft;
a plurality of follower gears operable to individually mesh with said sun gear; and
a plurality of layshafts each extending along individual central axes between respective first and second ends and supporting one of said plurality of follower gears, each of said plurality of layshafts directly engageable with said plate member through mutual engagement with an elongate member in a plurality of different index positions for supporting said respective follower gear in the plurality of different index positions relative to said axis of rotation, wherein the index positions prohibit mutual engagement of the plate member relative to the elongate member in an intermediate space between index positions, wherein the different index positions results in a plurality of different radial positions of the individual central axes to the axis of rotation of the input shaft.

13. The gear box of claim 12 further comprising:
a plurality of mounting blocks included with the plurality of layshafts and centered on a secondary axis parallel to said central axis of said respective layshaft to create a layshaft device, said plurality of mounting blocks operable to engage said plate member to limit movement of said plurality of layshafts, wherein the elongate engagement member directly couples respective mounting block and the plate.

14. The gear box of claim 13 wherein said plate member further comprises:
a plate portion extending radially with respect to said first axis of rotation; and
a plurality of bosses spaced from one another and each projecting from said plate portion along said first axis of rotation, wherein each of said plurality of bosses includes a blind aperture operable receive one of said mounting blocks.

15. The gear box of claim 14 wherein at least one of said mounting blocks includes a cylindrical outer surface and at least one of said plurality of blind apertures includes a cylindrical inner surface for receiving said cylindrical outer surface.

16. The gear box of claim 15 further comprising:
a jig having a collar encircling said input shaft and spaced from said plate member along said first axis of rotation, a plurality of arms each extending radially from a root at said collar to a distal end, and a plurality of through-apertures individually defined in one of said plurality of arms, wherein one of said second ends of said plurality of layshafts is received in one of said plurality of through-apertures.

17. The gear box of claim 16 wherein all of said plurality of through-apertures are spaced an equal distance from said axis of rotation.

18. The gear box of claim 17 wherein said plate member is stationary in supporting said follower gears.

* * * * *